March 26, 1940.  U. A. INMAN  2,194,753
HYDRAULIC BRAKE BLEEDER
Filed Sept. 6, 1938
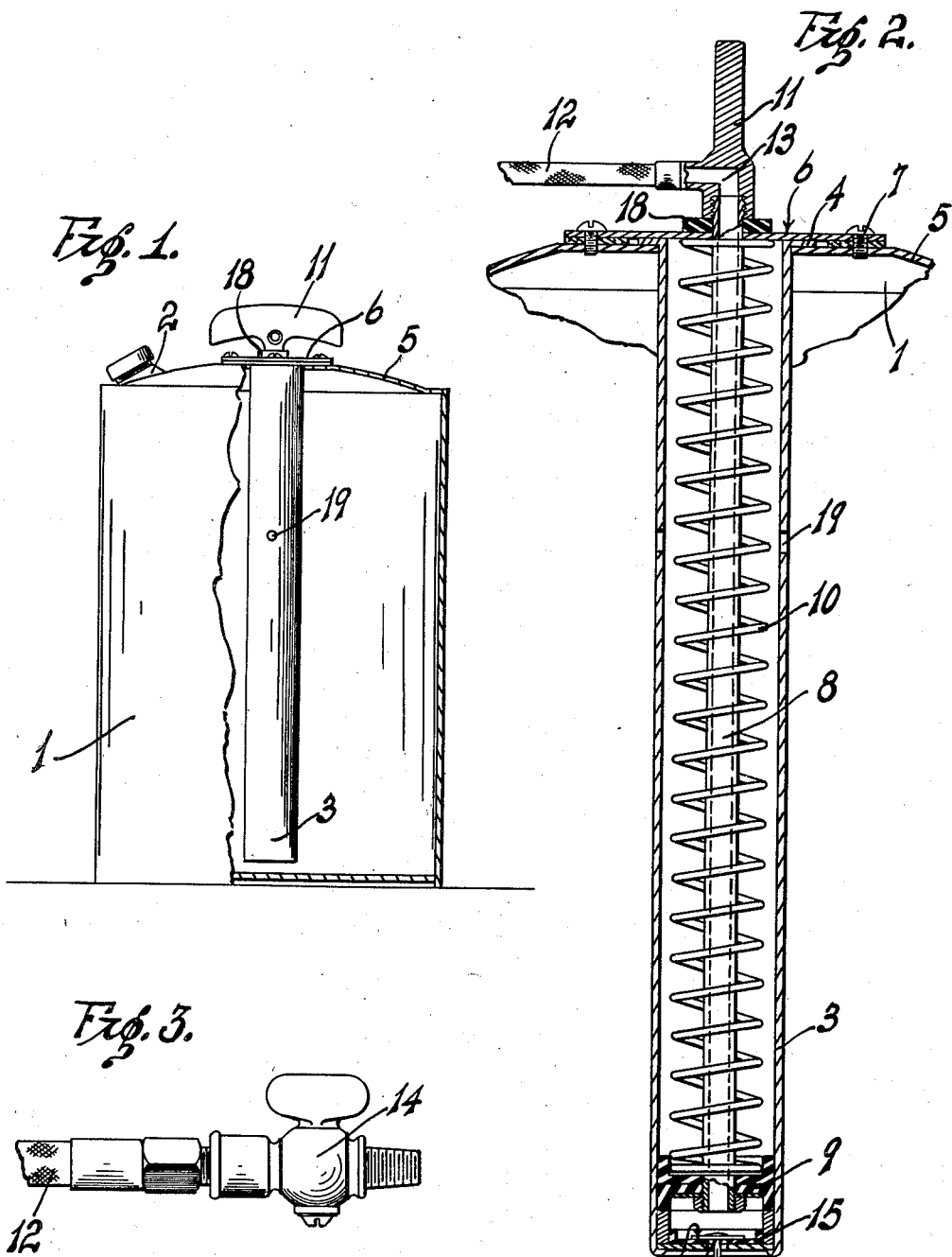
INVENTOR.
ULYSSES A. INMAN.
BY
ATTORNEY.

Patented Mar. 26, 1940

2,194,753

UNITED STATES PATENT OFFICE 2,194,753

HYDRAULIC BRAKE BLEEDER

Ulysses A. Inman, Long Beach, Calif.

Application September 6, 1938, Serial No. 228,600

2 Claims. (Cl. 221—80)

This invention relates to a novel hydraulic brake bleeder whereby the operating fluid for the hydraulic brakes of vehicles can be removed and replaced with new fluid.

An object of my invention is to provide a novel brake bleeder which is simple in construction, inexpensive to manufacture and effective in operation.

Another object of my invention is to provide a novel brake bleeder which will force fluid into a brake system on raising of a single lever, the force required to urge the fluid into the brake system being provided by a coil spring and the outlet of the bleeder extending through the piston rod.

Other objects, advantages and features of invention may appear from the accompanying drawing, the subjoined detailed description and the appended claims.

In the drawing:

Figure 1 is a side elevation of my brake bleeder with parts broken away to show interior construction.

Figure 2 is a longitudinal, sectional view of the hydraulic cylinder.

Figure 3 is a side elevation of the control valve on the outer end of the flexible tubing.

Referring more particularly to the drawing, the numeral 1 indicates a metal container, which is filled with the brake fluid. Material is placed in the container through the capped port 2. A hydraulic cylinder 3 is suspended vertically in the container 1 and substantially in the center of the container 1 the lower end of the cylinder is spaced slightly from the bottom of the container so that the brake fluid can enter at the bottom of the cylinder as will be further described. The upper end of the cylinder is flanged outwardly as shown at 4; thus supporting the cylinder from the head 5 of the container. A plate 6 bears against the top of the container and a plurality of screws 7 hold the plate in position on the head 5 and also press the flange 4 tightly against the head so as to fixedly hold the cylinder in position. A tubular piston rod 8 extends downwardly through the plate 6 and a pair of cup washers 9 on the lower end of the rod provide a piston. A coil spring 10 surrounds the rod 8 and bears against the plate 6 and the piston 9 to urge the piston downwardly in the cylinder.

A handle 11 is attached to the upper end of the tubular rod 8 and a flexible hose 12 is attached to the handle at one end and communicates with the tubular rod 8 through the port 13 in the handle. A valve 14 is mounted on the outer end of the hose and this valve is controlled by the workman to admit brake fluid into the brake system of an automobile. A cup valve 15 is positioned in the lower end of the cylinder 3 and includes a vertically moveable pin valve 16 which controls the intake port 17 in the bottom of the cylinder; thus when the piston is drawn upwardly, fluid will be taken in through the port 17 and will fill the space in the cylinder below the piston. The spring 10 then urges the piston 9 downwardly and fluid is forced upwardly through the tubular rod 8 and thence out through the hose 12 to the vehicle brake system. An annular packing 18 surrounds the rod 8 below the handle 11 for the purpose of sealing the container 1 when the handle 11 is down.

The spring 10 will press the handle against the packing thus sealing the space around the rod 8 and evaporation of the brake fluid is thus prevented. Holds 19 are provided in the cylinder 3 above the travel of the piston 9 so that fluid will pass into the cylinder above the piston, thus providing fluid on both sides of the piston and preventing the fluid from by-passing from one side of the piston to the other.

Having described my invention, I claim:

1. A brake bleeder comprising a container, a cylinder adapted to be inserted through an aperture provided in the top of the container, a plate bearing against the top of the cylinder, screws extending through the plate into the top of the container, a tubular rod extending into the cylinder, a cup piston mounted on the lower end of the rod, said rod extending through the cup piston and communicating with the cylinder, a coil spring bearing against the piston and urging said piston downwardly in the cylinder, a vertically moveable pin valve in the bottom of the cylinder, a handle on the upper end of the rod, a hose attached to the handle, said handle having a bore therein extending from the hose being connected to the tubular rod.

2. A brake bleeder comprising a container, a cylinder adapted to be inserted through an aperture provided in the top of the container, a flange on the cylinder, resting on top of the container, a plate bearing against the top of the cylinder, screws extending through the plate into the top of the container, a tubular rod extending into the cylinder, a cup piston mounted on the lower end of the rod, said rod extending through the cup piston and communicating with the cylinder, a coil spring bearing against the piston and urging said piston downwardly in the cylinder, a vertically moveable pin valve in the bottom of the cylinder, a handle on the upper end of the rod, a hose attached to the handle, said hose being connected through the handle to the tubular rod, and a packing ring surrounding the rod and positioned below the handle.

ULYSSES A. INMAN.